United States Patent [19]

Minogue

[11] Patent Number: 5,397,189
[45] Date of Patent: Mar. 14, 1995

[54] NON-PLANAR ERGONOMIC KEYBOARD

[76] Inventor: Richard F. Minogue, 12334 Happy Hollow Rd., Cockeysville, Md. 21030

[21] Appl. No.: 55,683

[22] Filed: Apr. 29, 1993

[51] Int. Cl.⁶ ............................................. B41J 5/10
[52] U.S. Cl. ................................... 400/489; 400/488
[58] Field of Search ............... 400/489, 490, 482, 483, 400/486, 484, 488

[56] References Cited

U.S. PATENT DOCUMENTS

| | | | |
|---|---|---|---|
| 4,483,634 | 11/1984 | Frey et al. | 400/488 |
| 5,029,260 | 7/1991 | Rollason | 400/489 |
| 5,059,048 | 10/1991 | Sirkin | 400/486 |
| 5,119,078 | 6/1992 | Grant | 400/486 |

FOREIGN PATENT DOCUMENTS

| | | | |
|---|---|---|---|
| 0515623 | 3/1920 | France | 400/489 |
| 0969069 | 12/1950 | France | 400/489 |
| 1245957 | 1/1960 | France | 400/489 |
| 2725677 | 12/1977 | Germany | 400/486 |
| 4108096 | 9/1992 | Germany | 400/472 |

OTHER PUBLICATIONS

"Split Keyboard" IBM Technical Disclosure Bulletin vol. 29, No. 7, Dec. 1986.

Tom Thompson, "A Peck of New Apple Macintoshes" BYTE, Nov., 1991, pp. 50–51.

*Primary Examiner*—Edgar S. Burr
*Assistant Examiner*—Anthony H. Nguyen
*Attorney, Agent, or Firm*—Max Stul Oppenheimer

[57] ABSTRACT

A novel ergonomic keyboard provides improved user comfort while maintaining a configuration sufficiently close to conventional keyboards to minimize the need for retraining of experienced keyboard users. The novel keyboard is arcuate, with central keys situated closer to the user, and sloped in two directions, with keys sloping up toward the center and sloping up away from the user's position.

4 Claims, 7 Drawing Sheets

NON-PLANAR ERGONOMIC KEYBOARD

FIELD OF THE INVENTION

This invention relates to keyboards and more particularly to ergonomic keyboards.

BACKGROUND

A problem associated with conventional keyboards, Repetitive Stress Injury (also known as Repetitive Motion Injury or Carpal Tunnel Syndrome) ("RSI") has received considerable attention. A discussion of the problem is set forth in detail in U.S. Pat. No. 5,137,384 (Ergonomic-interface keyboard system) issued Aug. 11, 1992 to Spencer and Albert, which is incorporated herein by reference.

Attempts to address the RSI problem include a number of issued United States Patents, each of which are incorporated herein by reference.

- U.S. Pat. No. 5,137,384 (Ergonomic-Interface Keyboard System), issued Aug. 11, 1992 to Spencer and Albert, discloses a keyboard which is split into two laterally spaced, vertically oriented halves, coupled with visual-reference mirrors that allow the user to visually reference the keyboard surface.
- U.S. Pat. No. 4,378,533 (Data Input System Using A Split Keyboard), issued Mar. 29, 1983 to McCall, discloses a divided keyboard set upon a common transverse platen which enable the user to space and orient horizontal keypads at a comfortable interval.
- U.S. Pat. No. 4,913,573 (Alpha-Numeric Keyboard), issued Apr. 3, 1990 to Retter, discloses a keyboard arranged into two separate horizontal keypads which feature portions wherein the keys are set on a vertical plane.
- U.S. Pat. No. 5,004,196 (Keyboard Accessor) issued Apr. 2, 1991 to Gross, discloses dual laterally adjustable horizontal hand-palm rests relative to a substantially conventional horizontal keyboard.
- U.S. Pat. No. 4,661,005 (Splitable-Keyboard For Word-processing Typing And Other Information-input Systems), issued Apr. 28, 1987 to Lahr, discloses a keyboard in which two keypads may be moved apart and pivotally adjusted toward 45 degrees of slope.
- U.S. Pat. No. 5,129,747 (Keyboard), issued Jul. 14, 1992 to Hutchinson, discloses a keyboard in which the rows of keys are arranged in a chevron shape.

In addition, the following United States Patents provide keyboards designed for comfort of the user. Again, these are incorporated herein by reference.

- U.S. Pat. No. 4,515,086 (Adjustable Word Processor Work Station), issued May 7, 1985 to Kwiecinski and Yauger, discloses a work station for a word processing system, the keyboard of which may be adjusted to limited heights and limited angular adjustment.
- U.S. Pat. No. 5,073,050 (Ergonomic Keyboard Apparatus), issued Dec. 17, 1991 to Andrews, discloses another split keyboard which provides means for tilting the two halves.
- U.S. Pat. No. 5,017,030 (Ergonomically Designed Keyboard), issued May 21, 1991 to Crews, discloses a keyboard inclined at an angle substantially equal to the inclination of the forearm of the user.
- U.S. Pat. No. 4,658,124 (Keyboard Having Variable Inclination Of The Key Plant), issued Apr. 14, 1987 to Bertina, disclosed another keyboard which may be tilted.
- U.S. Pat. No. 4,402,624 (Device For Adjusting The Slope Of A Keyboard), issued Sep. 6, 1983 to Stahl, discloses a device for changing the angle of inclination of the working face of a keyboard.

Each of these disclosures provide for tilting the entire keyboard while maintaining the essentially planar and rectangular nature of the keyboard itself.

A number of the individual features of the present invention may be found, although not in the combination disclosed and claimed herein, in the following United States Patents, each of which is incorporated herein by reference.

- U.S. Pat. No. 4,483,634 (Keyboard Arrangement), issued Nov. 20, 1984 to Frey, discloses a keyboard subdivided into two keyfields which rise from the operator side of the keyboard and which enclose an angle open towards the operator but which are mounted on a substantially rectangular support. Frey notes that other arrays of keys are possible, including arc-like rows with the concave side of the arcs facing the user. While Frey states that this would result in a better adaptation to the different lengths of the fingers, he also notes that "a consistent realization of this principle . . . would result in different distances of the keys in the different rows" and provides no solution for this drawback.
- U.S. Pat. No. 3,945,482 (Orthogonal Input Keyboards), issued Mar. 23, 1976 to Einbinder, discloses an orthogonal ten-finger keyboard (a plurality of vertically oriented keys adjacent to horizontal home keys). While Einbinder also suggests differences in key top heights to compensate for differences in finger lengths, the height of keys operated by the little finger are tallest, followed by keys operated by the fourth finger, precisely the opposite arrangement of the present invention.
- U.S. Pat. No. 4,597,681 (Adjustable Keyboard), issued Jul. 1, 1986 to Hodges, discloses a divided keyboard in which each key is separately adjustable angularly, laterally and in height. The Hodges invention could, of course, be employed to create the variation in heights taught by the present invention, but Hodges does not disclose or motivate any deviation from the rectangular arrangement of keys. In fact, Hodges specifically calls for a keyboard "mounted upon a rigid, flat, rectangular support".
- U.S. Pat. No. 5,141,343 (Compressible/Expandable Keyboard With Adjustable Key Spacing), issued Aug. 25, 1992 to Roylance, discloses a keyboard with adjustable spacing between the keys for the purpose of allowing a full-size keyboard to be compressed for storage.
- U.S. Pat. No. 4,735,520 (Key Holding Structure Of Keyboard With Curved Operating Surface Of Keys), issued Apr. 5, 1988 to Suzuki and Takagi, discloses a keyboard having a downwardly curved keyboard surface which parallels a downwardly curved key holder plate.
- U.S. Pat. No. 4,528,428 (Key-Holding Structure Of Keyboard With Curved Operating Surface Of Keys), issued Jul. 9, 1985 to Gotoh and reissued Jul. 4, 1989 (RE 32,974), discloses a keyboard with a curved operating surface wherein the top faces of its keys define a downwardly convex profile in cross-section.

SUMMARY OF THE INVENTION

Each of the above approaches present disadvantages, such as the need to learn a new keyboard orientation, the need to learn a new keyboard "feel", the need for individual adjustment of keyboard components (thereby requiring readjustment if a second individual uses the same keyboard, in addition to requiring periodic maintenance adjustment) or the need for additional mechanical components which increase the cost and service requirements of the keyboard.

It is an object of the present invention to reduce or eliminate these disadvantages. Among the further objects of the present invention are to provide a new and useful keyboard apparatus which can place less physical stress on the user and which can reduce the risk of RSI.

It is another object of the invention to provide an ergonomic keyboard with an arrangement of keys sufficiently close to that of conventional keyboards so as to minimize or eliminate the need for retraining of an experienced keyboard user.

It is yet another object of the invention to provide a keyboard in which the keys are arranged in a non-planar, arcuate pattern.

It is yet another object of the invention to provide a keyboard which is non-rectangular.

It is yet another object of the invention to provide a keyboard which maintains essentially conventional spacings between keycap centers.

These objects are achieved, in accordance with the invention, by providing a keyboard whose principal feature is a novel arrangement of keys and whose advantages include potential reduced physical stress on the user, sufficient similarity to conventional keyboards to reduce the need for retraining of experienced keyboard users, and simplicity of design, operation and maintenance.

The invention described and claimed herein comprises an ergonomic keyboard in which the keys are essentially conventional keyboard keys and the inter-key spacing (i.e., the space between centers of adjacent keys) is essentially the same as conventional spacing, but the keyboard is both non-planar and non-rectangular in order to improve user comfort.

The invention can be applied to any type of keyboard, such as a typewriter keyboard, a computer keyboard, a cash register keyboard, a musical keyboard or a special-purpose keyboard.

Standards for keyboards vary, depending on the type of keyboard. The invention will be described with reference to a conventional typewriter or computer keyboard. Conventional typewriter and computer keyboards consist of an essentially planar, rectangular arrangement of keys in rows, the keys being attached to an essentially horizontal base and the keys of each row being staggered with respect to the keys of adjacent rows. In the case of a computer keyboard, a computer system comprises a central processing unit in communication with a keyboard used as an input device. Each key has a "key face", by which is meant the side of the key intended to be activated by a keyboard operator. For example, on a standard typewriter keyboard, the key face is the side marked with the symbol represented by that key The keyboard embodying the present invention is non-planar in that the height of the keys above the horizontal base plane increases toward the central keys. It is non-rectangular in that, in each row, the distance of the keys from the user decreases toward the central keys.

The various features of novelty which characterize the invention are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will be apparent, along with various advantages and features of novelty residing in the present embodiments, from study of the following drawings, in which:

FIG. 9 shows a keyboard mounted on a base which also incorporates a trackball.

DESCRIPTION OF THE PREFERRED EMBODIMENT

Figure 1:
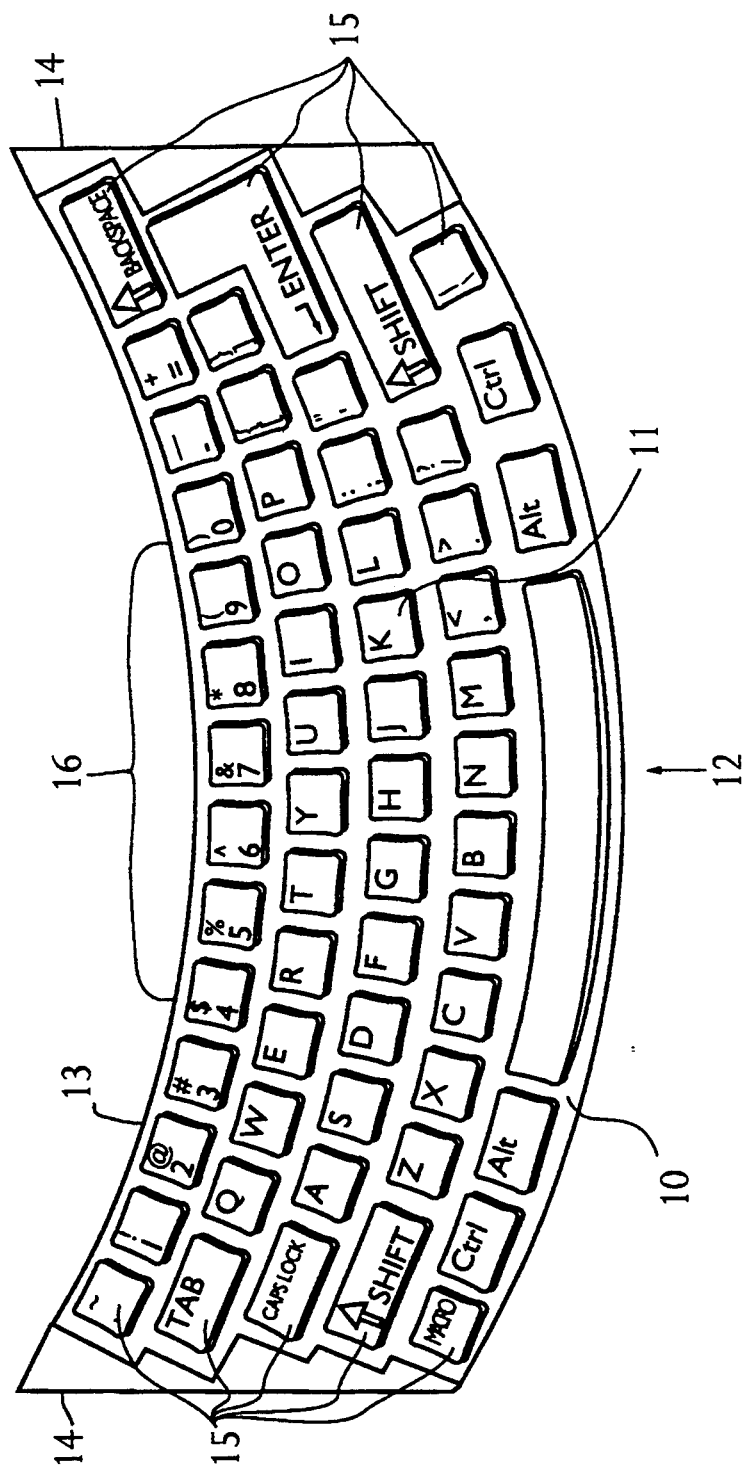
FIG. 1 is a top view of a keyboard according to the invention.

Referring to the drawings, the invention is a novel keyboard, characterized by the arrangement of its keys.

Figure 3:
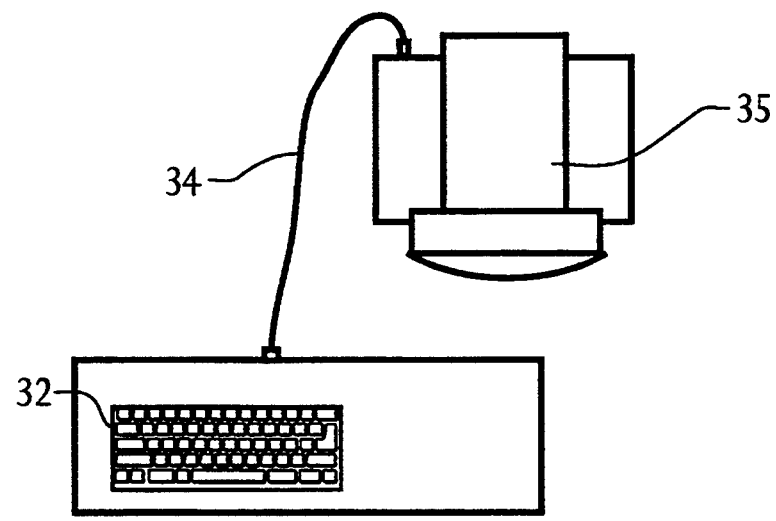
FIG. 3 is a top view of conventional keyboard.
Figure 9:
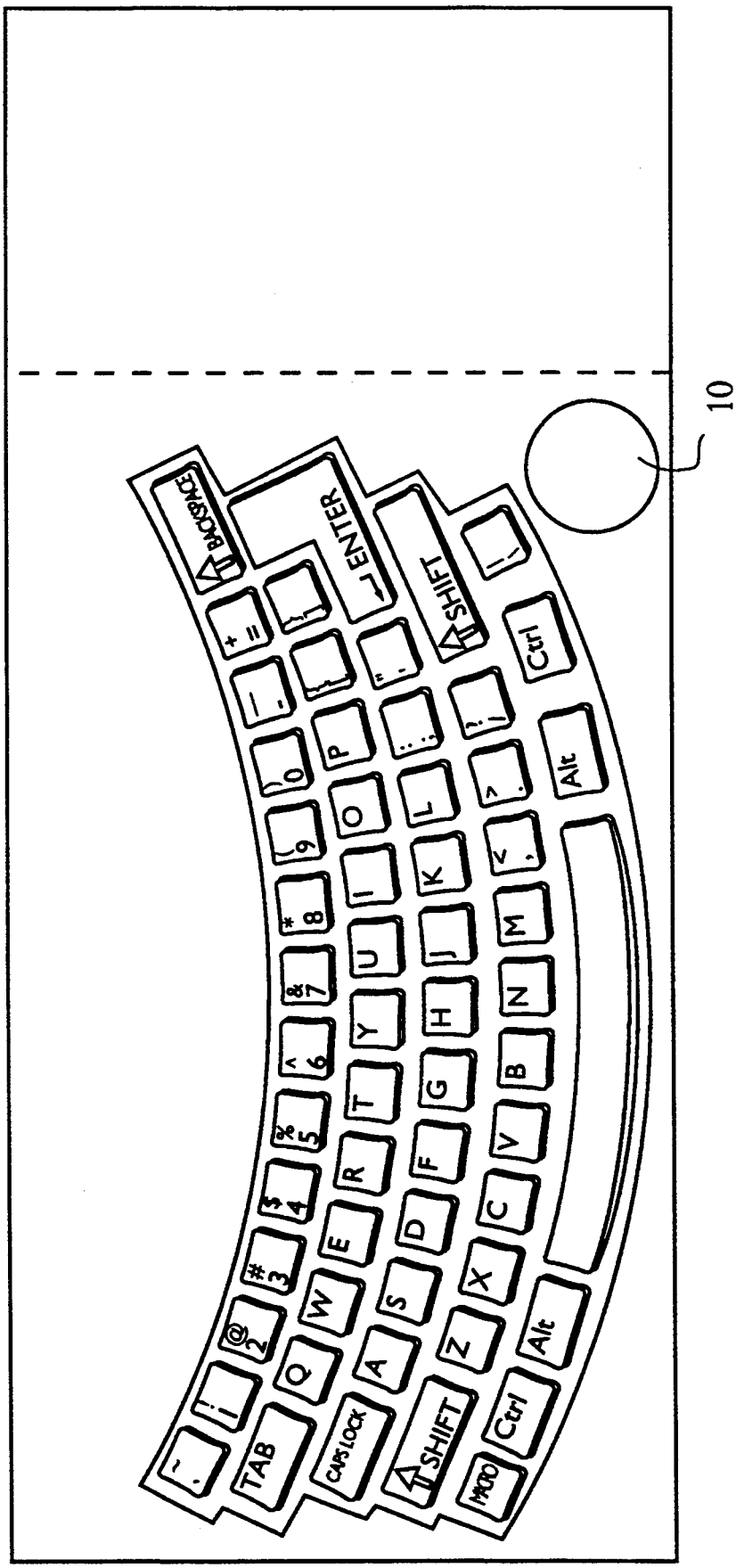
FIG. 9 shows an embodiment of the present invention.
Figure 10:
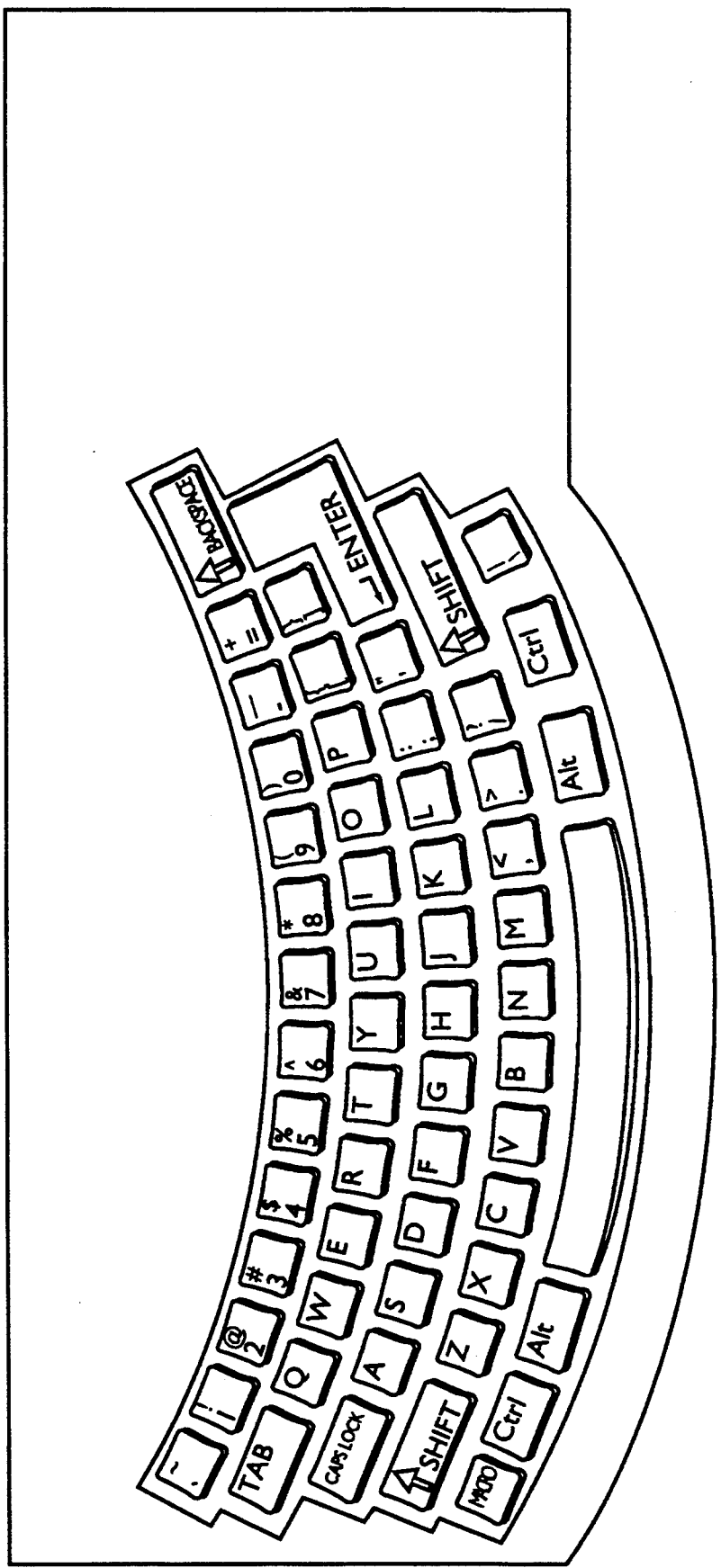
FIG. 10 shows a keyboard.

Although applicable to other keyboards, the invention may be illustrated with reference to a conventional typewriter or computer keyboard. As illustrated in FIG. 3, conventional keyboards (32) consist of an essentially planar, rectangular arrangement of keys in rows, the keys of each row being staggered with respect to the keys of adjacent rows. Such keyboards may also incorporate additional elements, such as a trackball; keyboards designed according to the present invention may also incorporate such additional elements, such as a trackball (61) as shown in FIG. 9.

Figure 6:
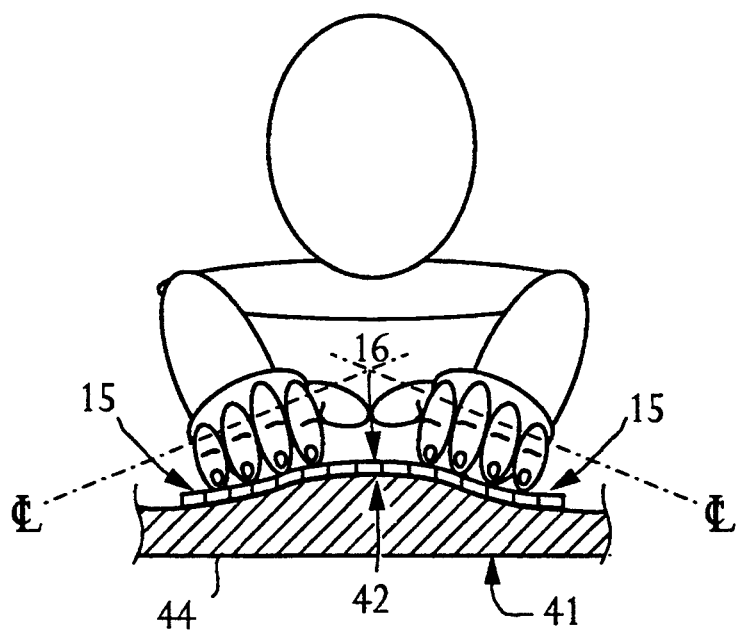
FIG. 6 is a cross-sectional view of a keyboard incorporating the invention
Figure 7:
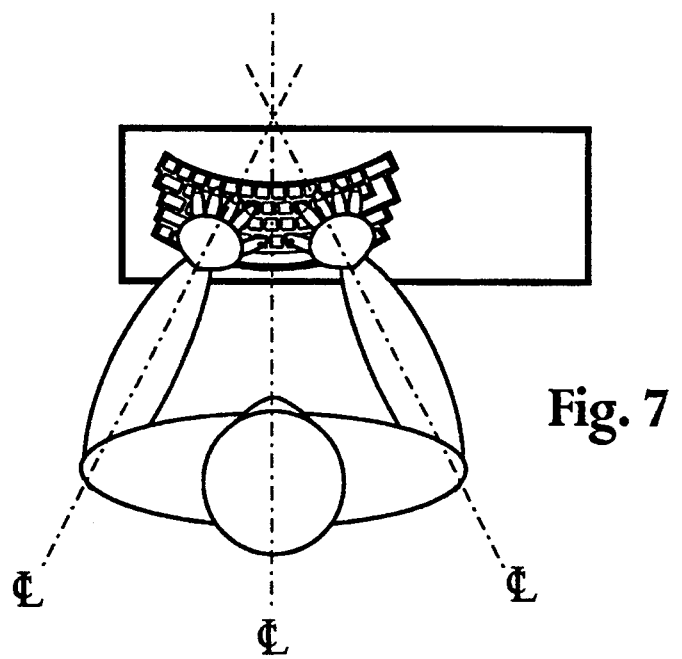
FIG. 7 is an overview showing an embodiment of the invention, with schematic illustration of a user in typing position.
Figure 8:
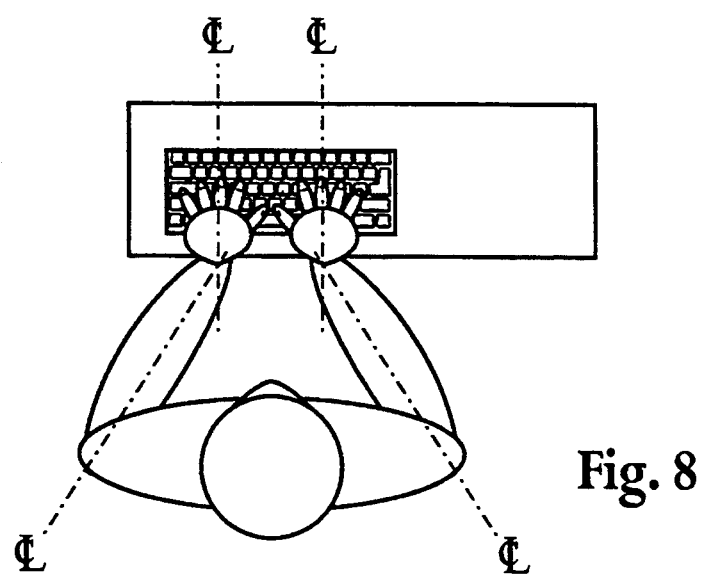
FIG. 8 is an overview showing a conventional keyboard, with schematic illustration of a user in typing position.

With reference to FIG. 1, the keyboard in accordance with the invention comprises a rigid frame or support (10) in which a plurality of keys (11) are mounted by conventional mounting means. The frame includes a lower surface (41) which defines a base plane and an upper surface (42) in which the keys (11) are placed, as illustrated in FIG. 6, and further includes four edges: a user edge which faces the user (12), a top edge (13) opposite said user edge (12) and two remaining edges referred to as the "outer edges" (14). Those keys at the outer edges are referred to as "outer keys" (15) while those farthest from the outer edges (14) are referred to as "central keys" (16).

As may be seen in FIG. 1, the invention may be constructed using readily available conventionally sized and shaped keys, although, as discussed below, keys may be modified so as to more closely maintain conventional distances between centerpoints of the keycaps.

As illustrated in FIG. 1 the invention provides a unitary ergonomic keyboard comprising a plurality of keys (11) mounted in frame (10), said keys (11) being arranged in a plurality of rows, each row being comprised of one or more outer keys (15) and one or more central keys (16) and being of arcuate shape wherein the central keys (16) are situated closer to the user edge (12) than are the outer keys (15).

Figure 2:
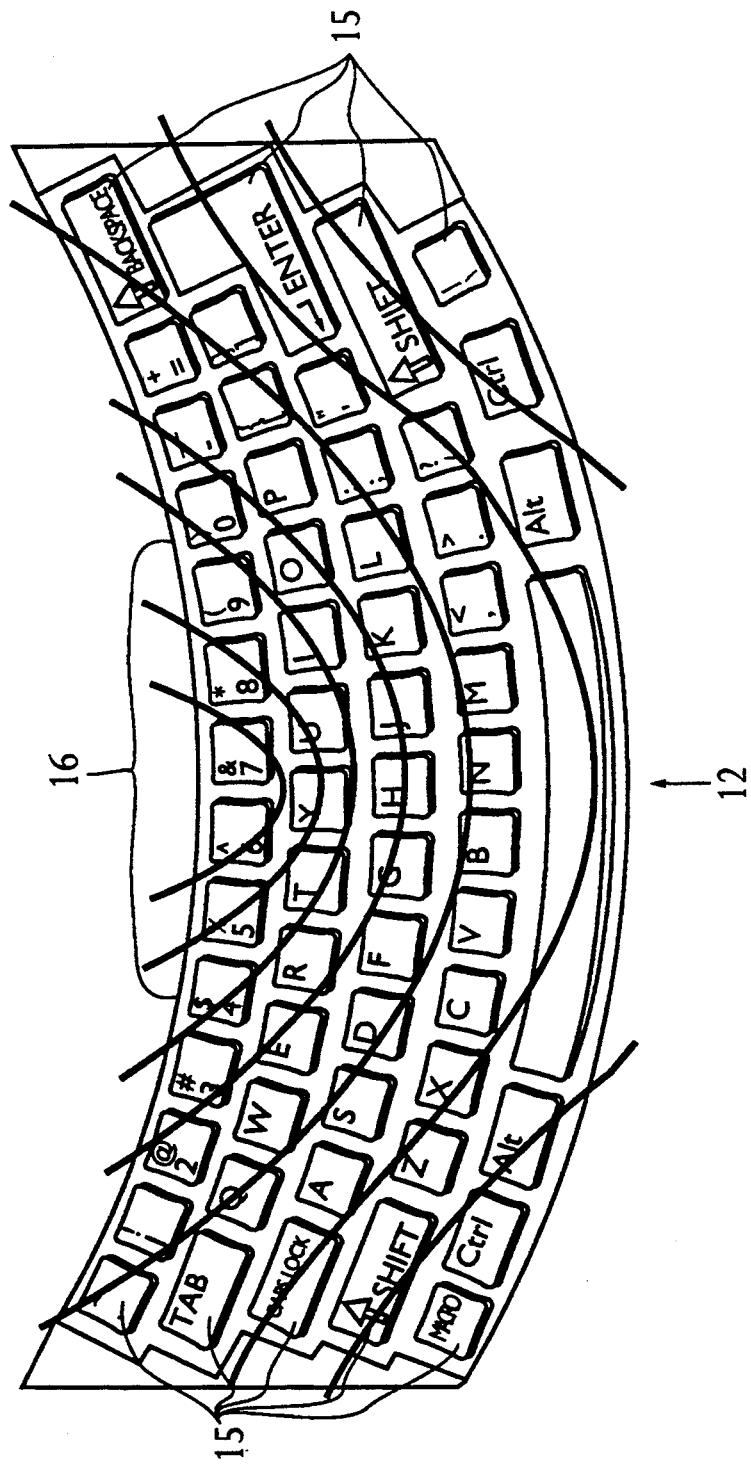
FIG. 2 is a top view of a keyboard incorporating the invention with topographic lines superimposed.

As can best be seen from the topographical lines shown in FIG. 2, the keys within each of said rows are placed at increasing heights toward the center of said row, so that the central keys (16) are elevated above the level of the outer keys (15). Still referring to the topographical lines of FIG. 2, it can be seen that the rows farther from the user edge (12) are placed at increasing heights above the rows closer to the user.

Figure 4:
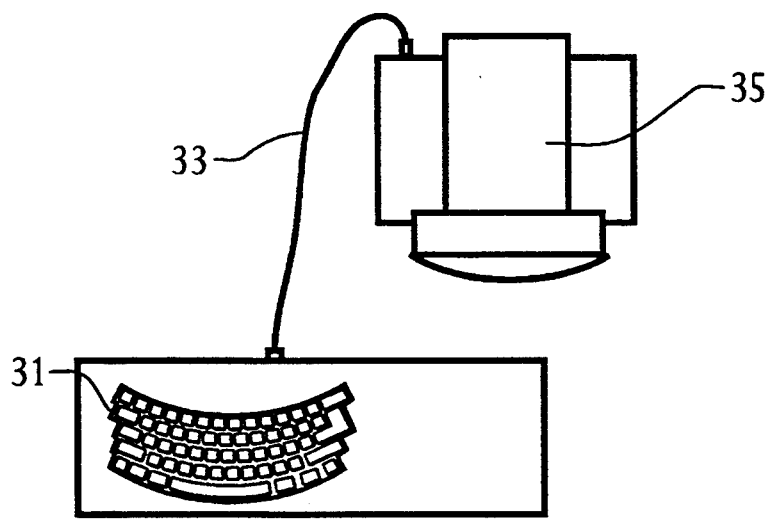
FIG. 4 is a top view of a keyboard incorporating the invention
Figure 5:
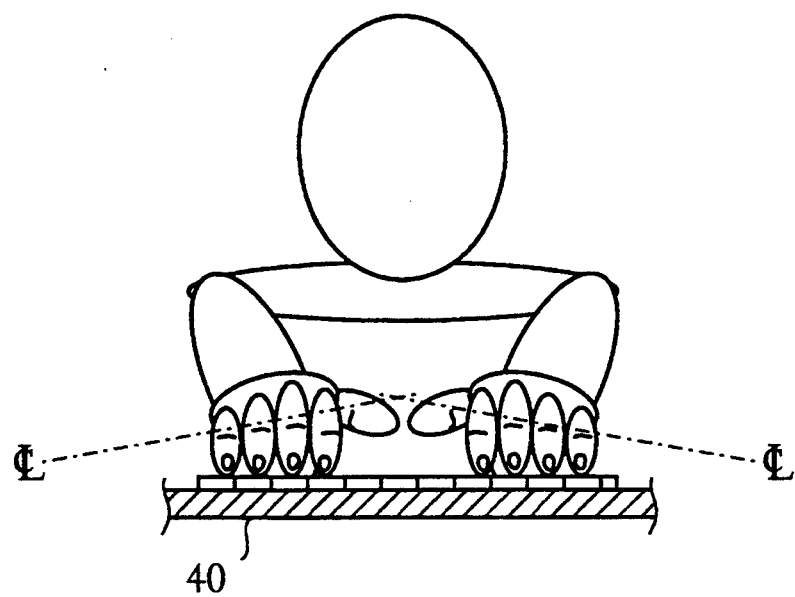
FIG. 5 is a cross sectional view of conventional keyboard.

As can best be seen in FIG. 4, the arrangement of keys just described can be provided in a keyboard embodying the invention (31) while still maintaining essentially the same inter-key spacing of a conventional keyboard (32) so that extensive retraining of a user familiar with the conventional keyboard is not required. A keyboard embodying the invention may be connected to a computer or central processing unit using the same techniques as are used in connecting a conventional keyboard, as shown schematically in FIG. 3 by the lines (33) and (34), communicating with computer (35). FIGS. 5 and 6 compares cross-sections of a conventional keyboard (40) and a keyboard embodying the invention (44) and shows the elevation of central keys (16) above outer keys (15) and the transition of heights from outer keys (15) to central keys (16).

This new keyboard design reduces stress in several ways. By allowing a user's hands to rotate toward a thumbs up position, the bones of the lower arms are not twisted together or against each other, thus reducing stress on the wrists and elbows. By shaping the keyboard as described, the wrists are no longer twisted away from the linear axis of the lower arms, but rather are oriented along that axis. By arranging the topography of the keycaps as described, the fingers no longer have as many varying stroke lengths, thus reducing manual compensation for uneven key stroke length and resultant finger joint fatigue.

An initial model of a keyboard incorporating the invention was constructed using conventional, off-the-shelf keycaps without modification of the keycaps. It was found that the novel shape resulted slight variation of inter-key spacings from those of the conventional keyboard. Another model was constructed, this time making minor adjustments to the off-the-shelf keycaps. These keycaps measured approximately 23/32"×23/32" at their base, and 8/15"×9/16" at their top face. It was found that conventional inter-key spacings could be maintained more closely by trimming less than 1/16" from the keycap edges, the exact amount from each side varying with the location of the key. Thus, with only minor variation in the keycap base and no variation in the keycap face, it was possible to achieve inter-key spacings closely similar to those of conventional keyboards, while maintaining the obvious advantage of a configuration to which an experienced keyboard user was already accustomed.

Thus, there has been described a keyboard that has a number of novel features. The features involve the placement of the keys in a configuration which reduces stress on the user without requiring extensive retraining of a user familiar with a conventional keyboard. While off-the-shelf keycaps may be used, a minor modification of such keycaps allows the novel arrangement of keys while maintaining familiar inter-key spacings. The advantages of the invention include the resultant comfort of the user, without the cost of retraining, without, added maintenance or adjustment costs and without requiring adjustment for particular users, thereby avoiding both the need for retraining of skilled keyboard users and also the need for readjustment of a keyboard each time a different user wishes to use the keyboard. The keyboard allows a comfortable alignment of shoulders, elbows, wrists and fingers to allow relaxation of muscles during prolonged keyboard use.

While a specific embodiment of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein, but is defined by the appended claims.

I claim:

1. An ergonomic keyboard comprising a continuous surface and further a frame or support, a plurality of keys mounted to said frame or support, said keys being arranged in a plurality of rows, each row comprised of two or more outer keys and one or more central keys and being of arcuate shape wherein the central keys of any row are situated closer to the user than are the outer keys of said row and wherein the central keys of any row are elevated above the level of the outer keys of said row, and wherein rows farther from the user are higher than rows closer to the user.

2. An ergonomic keyboard according to claim 1 wherein the spacing between the centers of the key faces is achieved by minor variations in the dimensions of the keycaps.

3. An ergonomic keyboard according to claim 2 wherein the minor variation consists of reducing the width of each key faces by less than 1/16".

4. An ergonomic keyboard according to claim 1, further comprising a trackball.

* * * * *